US010095629B2

(12) United States Patent
Guim Bernat et al.

(10) Patent No.: US 10,095,629 B2
(45) Date of Patent: Oct. 9, 2018

(54) LOCAL AND REMOTE DUAL ADDRESS DECODING USING CACHING AGENT AND SWITCH

(71) Applicant: Intel Corporation, Santa Clara, CA (US)

(72) Inventors: Francesc Cesc Guim Bernat, Barcelona (ES); Kshitij A. Doshi, Chandler, AZ (US); Steen Larsen, Portland, OR (US); Mark A Schmisseur, Phoenix, AZ (US); Raj K. Ramanujan, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 15/279,319

(22) Filed: Sep. 28, 2016

(65) Prior Publication Data

US 2018/0089098 A1    Mar. 29, 2018

(51) Int. Cl.
*G06F 13/00* (2006.01)
*G06F 12/10* (2016.01)

(52) U.S. Cl.
CPC ...... *G06F 12/10* (2013.01); *G06F 2212/1041* (2013.01); *G06F 2212/657* (2013.01)

(58) Field of Classification Search
CPC ............... G06F 12/084; G06F 2212/60; G06F 2212/62; G06F 12/10; G06F 2212/657; G06F 2212/1041

USPC ......... 711/202, 206, 118; 709/217, 218, 219
See application file for complete search history.

(56) References Cited

U.S. PATENT DOCUMENTS

| | | | |
|---|---|---|---|
| 5,983,326 A * | 11/1999 | Hagersten | G06F 12/0813 711/140 |
| 2010/0082675 A1* | 4/2010 | Shitomi | G06F 17/302 707/782 |
| 2015/0121022 A1* | 4/2015 | Imming | G06F 11/2058 711/162 |
| 2016/0283278 A1* | 9/2016 | Duran Gonzalez | G06F 9/3851 |
| 2016/0283375 A1* | 9/2016 | Das Sharma | G06F 12/084 |
| 2017/0344283 A1* | 11/2017 | Guim Bernat | G06F 3/0619 |

* cited by examiner

*Primary Examiner* — Hong Kim
(74) *Attorney, Agent, or Firm* — Schwegman Lundberg & Woessner, P.A.

(57) ABSTRACT

Generally discussed herein are systems, devices, and methods for local and remote dual address decoding. According to an example a node can include one or more processors to generate a first memory request, the first memory request including a first address and a node identification, a caching agent coupled to the one or more processors, the caching agent to determine that the first address is homed to a remote node remote to the local node, a network interface controller (NIC) coupled to the caching agent, the NIC to produce a second memory request based on the first memory request, and the one or more processors further to receive a response to the second memory request, the response generated by a switch coupled to the NIC, the switch includes a remote system address decoder to determine a node identification to which the second memory request is homed.

25 Claims, 9 Drawing Sheets

LOCAL AND REMOTE DUAL ADDRESS DECODING USING CACHING AGENT AND SWITCH

TECHNICAL FIELD

Embodiments generally relate to computing systems and, more particularly, to systems, devices, and methods for multi-level address decoding.

TECHNICAL BACKGROUND

Computer processing nodes include system address decoders to determine to which memory a request is directed. Keeping the address of all the memories universally consistent can be challenging. Memories can be decommissioned, fault out, or otherwise become inoperable, thus altering accessible address space. In some current distributed shared memory (DSM) systems, every system address decoder of the DSM system needs to be updated to reflect changes in the memory structure so that memory access requests are routed properly and faults are reduced. This system address decoder update is cumbersome, tedious, and can cause unwanted downtime and address decoding errors in the system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
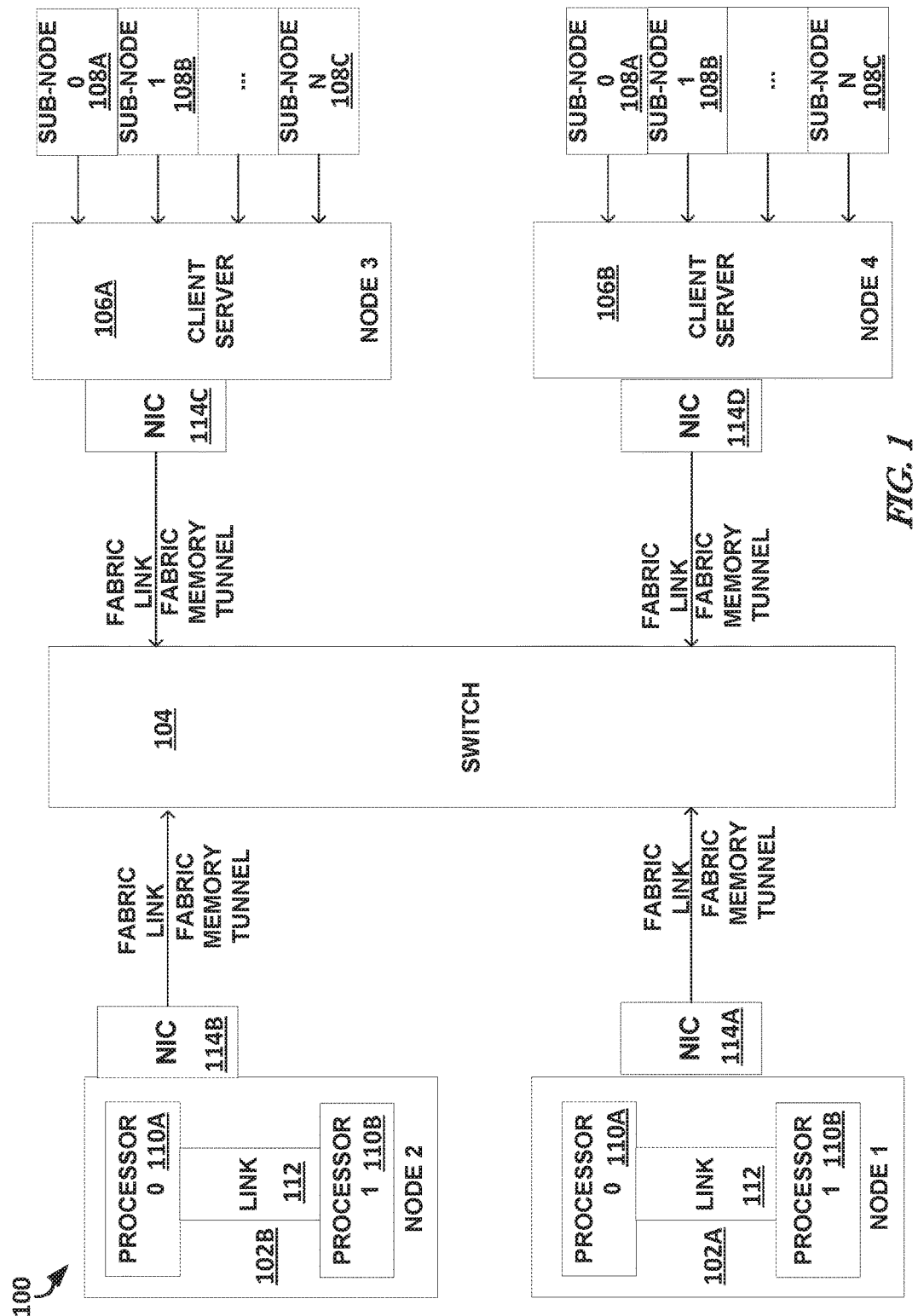
FIG. 1 illustrates, by way of example, a logical block diagram of an embodiment of a DSM system.

Examples in this disclosure relate to devices and systems that include multiple levels of address decoding. In one or more embodiments, a first level of decoding can be performed locally by a local system address decoder and a second level of decoding can be performed by a system address decoder of a switch between a local node and a remote node.

A distributed shared memory (DSM) is a memory architecture where physically separate memories are addressed as one shared address space. Shared means that the address space is shared such that a same physical address from two physically separate processors refers to a same location in the DSM.

A Home Agent (HA) is the node (e.g., node cluster) that is responsible for processing a memory request from a caching agent and acting as a home for part of the memory address space (note that one die (e.g., processor) can have multiple homes in a distributed address space mapping). Depending on the address space that a request is targeting, a request can go to the same node's local memory. Additionally or alternatively, a memory request can go to an interface (e.g., a universal peripheral interface (UN)) to route the request to the other processors within the same coherent domain, or to processors outside the coherent domain, through the NIC. Sometimes a NIC is referred to as a host-fabric interface. All the processors connected on one side of the interface belong to the same coherent domain.

One system can include one or more coherent domains connected through a fabric interconnect (e.g., one or more of a fabric link, a fabric memory tunnel, and a switch). For example high performance computing (HPC) or data centers can include N clusters or servers that can communicate with each other using the fabric. Using the fabric, each coherent domain can expose some address regions to the other coherent domains. However, accesses between different coherent domains are not coherent. Embodiment herein allow mapping address of memory ranges between different coherent domains.

Current implementations of a DSM include system address decoders that map the entire address space. Each address is homed to a corresponding node. The system address decoders can determine where a memory address is homed, can modify a request accordingly, and forward the (modified) memory request to a switch that forwards the memory request to the proper destination (e.g., memory controller).

A memory request under current embodiments can proceed as follows: (1) a node generates a memory request (e.g., a memory read or a memory write request); (2) the memory request is provided to a caching agent (CA); (3) the CA uses a system address decoder to decode that the memory request is homed to a memory location in a specific memory; (4) the system address decoder returns the address of the memory to which the request is homed; and (5) the memory request is forwarded to a memory controller of the memory to which the request is homed so that the memory request can be fulfilled.

Such DSM configurations are cumbersome in that every system address decoder includes a map to the entire address space of the DSM. If one address is changed somewhere in the DSM, all system address decoders need to be updated to reflect the change, such as to keep the address space coherent. Such a restriction reduces the flexibility and/or scalability of the DSM system. Removing or adding a memory to the system requires updating every system address decoder of the system to retain coherency. In some DSM systems, each node of many nodes can include many system address decoders. To retain coherency, each of these system address decoders need to be updated to reflect the same memory address space, in the event of a change to the address space. In dynamic environments in which a memory or node may join or leave a DSM either due to faults or by administrative action, the DSM can go through a lot of work to maintain decoding consistency. Embodiments discussed herein provide a DSM architecture that provides an ability to add or remove a memory without the burden of having to update every system address decoder of the system.

Embodiments discussed herein can help provide flexibility in scaling or otherwise altering a DSM, such as by adding a level of address decoding at a network switch and/or a network interface controller. Reference will now be made to the figures to discuss further details of embodiments of this disclosure.

FIG. 1 illustrates, by way of example, a logical block diagram of an embodiment of a DSM system 100. The DSM system 100 as illustrated includes a plurality of nodes 102A and 102B, a switch 104, and a plurality of client servers 106A and 106B respectively coupled to a plurality of remote nodes 108A, 108B, and 108C. Each of the nodes 102A-B is illustrated as including a plurality of hardware processors 110A and 110B communicatively connected via a link 112 and a network interface controller (NIC) 114A or 114B. Each of the client servers 106A-B includes a corresponding NIC 1140 and 114D, respectively. Each of the NICs 114A-D is communicatively coupled through the switch 104.

The DSM system 100, sometimes called a scale-out cluster, includes compute nodes (e.g., the nodes 102A-B) and pooled-resource nodes (e.g., the sub-nodes 108A-C accessible through the client servers 106A-B). The sub-nodes 108A-C provide the nodes 102A-B with additional memory. The memory of the sub-nodes 108A-C is exposed to the nodes 102A-B locally, such as by a software protocol (e.g., a distributed file system, object map, or the like).

Figure 2:
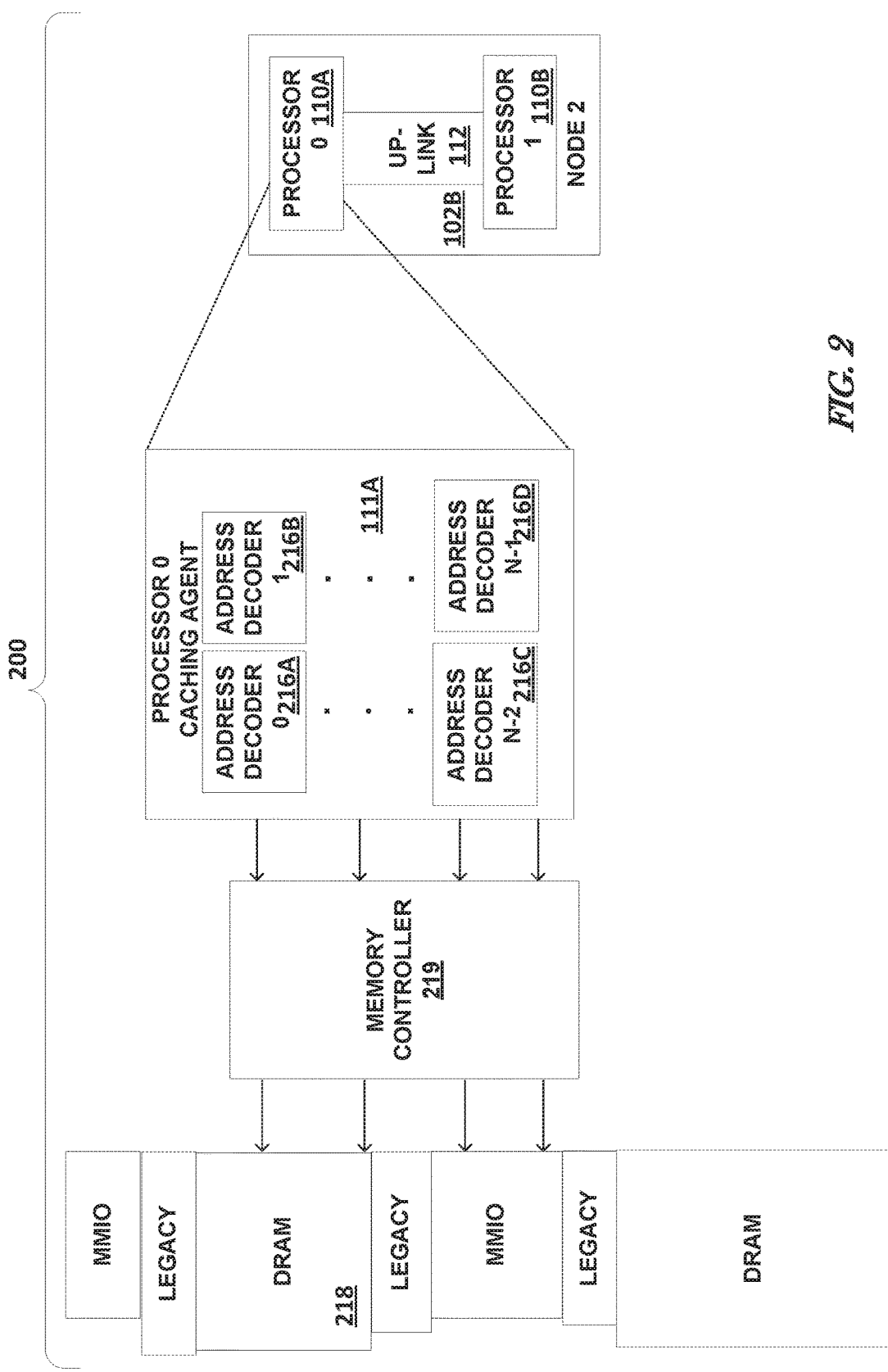
FIG. 2 illustrates, by way of example, an exploded view diagram of a portion of the system.

FIG. 2 illustrates, by way of example, an exploded view diagram of a portion 200 of the system 100. The exploded view is of the processor 110A and corresponding contents thereof. The processor 110A as illustrated includes a caching agent 111A with a plurality of system address decoders 216A, 216B, 216O, and 216D. Each of the system address decoders 216A-D decodes addresses homed to a specific node(s) of the system 100. In the system 100, there are four system address decoders per processor, one for each of the nodes 102A-B and 106A-B. The processor 110B includes a replica of the system address decoders 216A-D. Thus, if a memory is added or removed, 16 system address decoders need to be updated to maintain coherency. The caching agent 111A can forward an address request to a corresponding memory controller 219 (e.g., via one or more NICs, switches, and/or servers shown in FIG. 1). The memory controller 219 retrieves data corresponding to the memory request from a memory 218 or performs a memory write operation. The memory 218 as illustrated includes DRAM (dynamic random access memory), memory-mapped I/O (Input/Output), and legacy memory. Note that the layout of the memory is implementation specific.

The DRAM can include the memory of nodes connected to the server 106A-B and the local nodes 102A-B (FIG. 1), for example. In such embodiments, the system address decoders 216A-D combine to form a global decoder. Each processor 110A-B includes such a global decoder. In a scale-out cluster that implements DSM, any access to remotely situated memory (or any other memory in the DSM) is decoded by the local system address decoders 216A-D, and vectored to the appropriate node. Keeping the many global system address decoders updated within each node and consistent across nodes, such as when a memory is removed or added is thus a major undertaking. Such a configuration can inhibit flexibility of the system 100 and dynamic DSM operation.

One or more embodiments discussed herein can help provide one or more advantages, such as can include (1) elasticity and fault-resilience, (2) cost efficiency in implementing a change, and (3) segregating inter-node and intra-node request call decoding, thus segregating which decoders need to be updated in response to a memory change. With regard to elasticity and fault-resilience, a scale-out friendly DSM can benefit from supporting an increase or reduction in memory exposed by a given pooled memory server, redirected from a failed node to a stand-by node, and/or redistributing loads, or the like, all of which affect elasticity and/or fault resilience. Changing current system address decoders to be re-configurable is demanding, particularly if backward compatibility (support for legacy devices) is needed.

With regard to cost efficiency in implementing a change, by making remote address decoding a part of a network switch, a change in a given node requires changing only the local system address decoders (local to the node that is changed) and possibly the system address decoders of each of the switches. This is generally many fewer changes as compared to changing all of the system address decoders of the system. Consider a system with sixteen nodes with each node having sixteen processors (assuming a system address decoder per processor, per node) two hundred fifty-six system address decoders will need to be updated in the case of a change (if all system address decoders need to be changed to retain coherence). In some embodiments discussed herein, this updating burden could be isolated to just seventeen (or fewer) system address decoders.

With regard to segregating inter-node and intra-node decoding, the system address decoders of the switches only require changes for intra-node changes and not inter-node changes. For example, consider that previously a change in a system address decoder was configured at boot time and relatively static. Previous designs may not support distinguishing between nodes that are highly available (e.g., multi-homed) and those that are not, such as to allow for transparent synchronous replication operations via network switch logic. In one or more embodiments, a memory space can be replicated in multiple memory location, such that if a node fails, the system address decoder inside the switch is able to select another node in which the data is replicated. Thus there is higher availability as compared to other implementations. By isolating such configuration to inter-node and intra-node, run-time reconfigurability can be realized.

As previously discussed, embodiments discussed herein move address decoding for requests that are homed to remote nodes to one or more switches. In such embodiments, the local system address decoder only needs to know that a given range of addresses is horned locally and/or remotely (which can be configured at boot time). The actual remote node to which an address request is homed need not be known locally and can be determined using a global mapping as programmed into system address decoders of the switch(es). In one or more embodiments, the global mapping can be updated during run time.

Figure 3:
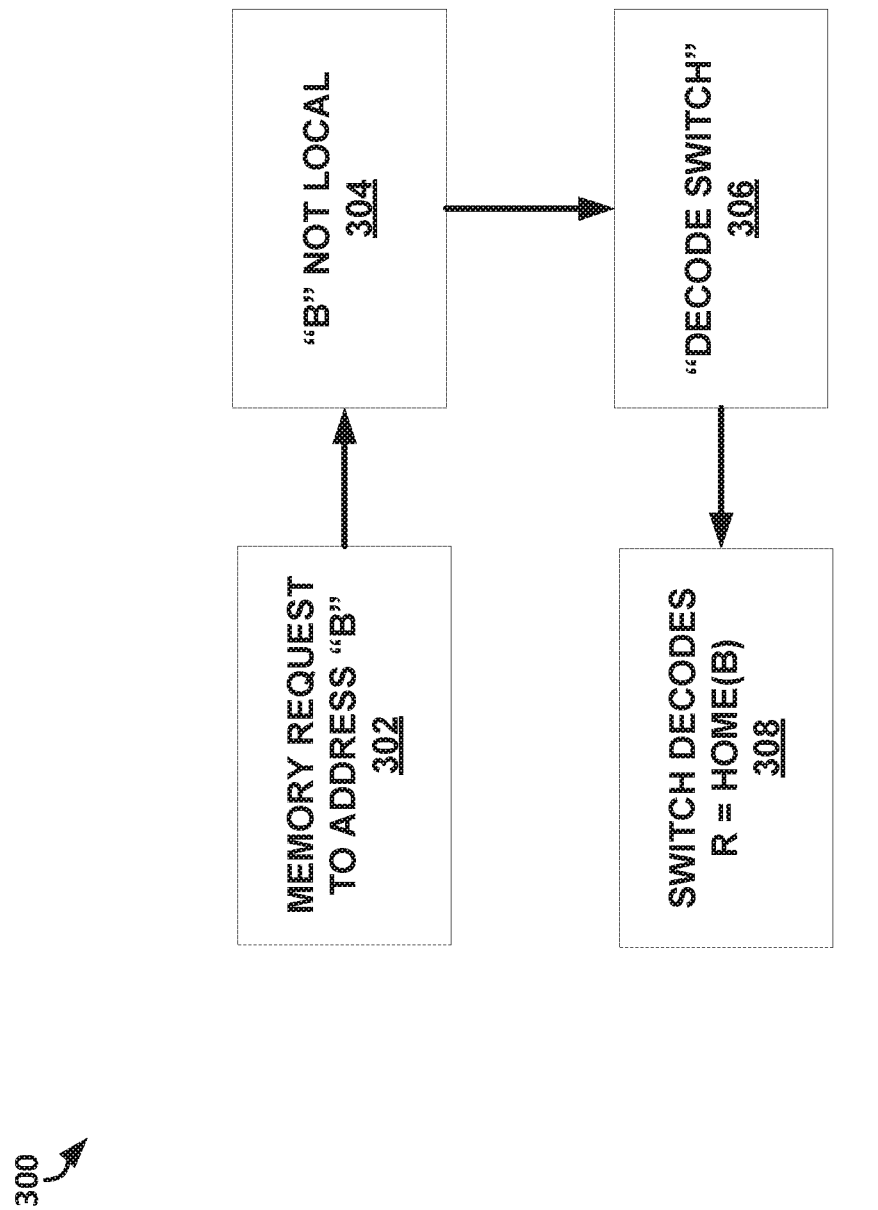
FIG. 3 illustrates, by way of example, a flow diagram of an embodiment of a technique of address decoding.

Thus, a two level address decoding scheme is discussed that can help achieve a flexible and/or scalable address decoding capability for non-local memory addresses. FIG. 3 illustrates, by way of example, a flow diagram of an embodiment of a technique 300 of multi-level address decoding. A memory request is provided to a local system address decoder, at operation 302. The memory request can include a get or put request, for example. A get request is a common command in programming languages that allows for retrieval of data from a destination (e.g., get(destination)). A put request is a common command in programming languages that allows for attempting to change a memory location to specific data (e.g., put (memory location, specific data)). A memory request can include an indication of a node that hosts the memory address that is a target of the request (e.g., a node identification) and/or a physical or virtual address of the memory space at which data is to be read or written.

At operation 304, the local system address decoder determines that the request is homed to an address that is not local (the request is homed to a remote node). This can be by determining that the address is not local (is not present in local memory and therefore is homed to a remote address) or determining that a characteristic of the request indicates that the memory request is a memory request for a remote address, such as a target identification in the request being blank or a specified value (of a specified range of values) (e.g., a maximum, minimum, or other value).

In response to determining the request is homed to an address that is not local, the local system address decoder can forward the memory request to a NIC that forwards the request to a switch using a switch decode request, at operation 306. In one or more embodiments, the NIC can modify the request before forwarding the request to the switch.

The switch determines a node identification corresponding to the memory address that is the subject of the request (e.g., in response to detecting that no target identification or a specific target identification is specified), at operation 308. The switch then generates another request (with the proper node identification) and forwards the request to the node that includes the corresponding address. The requested data (if a get request) or an acknowledgement (ACK) (if a put request) can then be routed back to the node that initiated the request, such as through one or more network interface controllers and/or switch(es). A not acknowledge (NACK) or error packet can be generated in the case of a failed get or put request.

Figure 4:
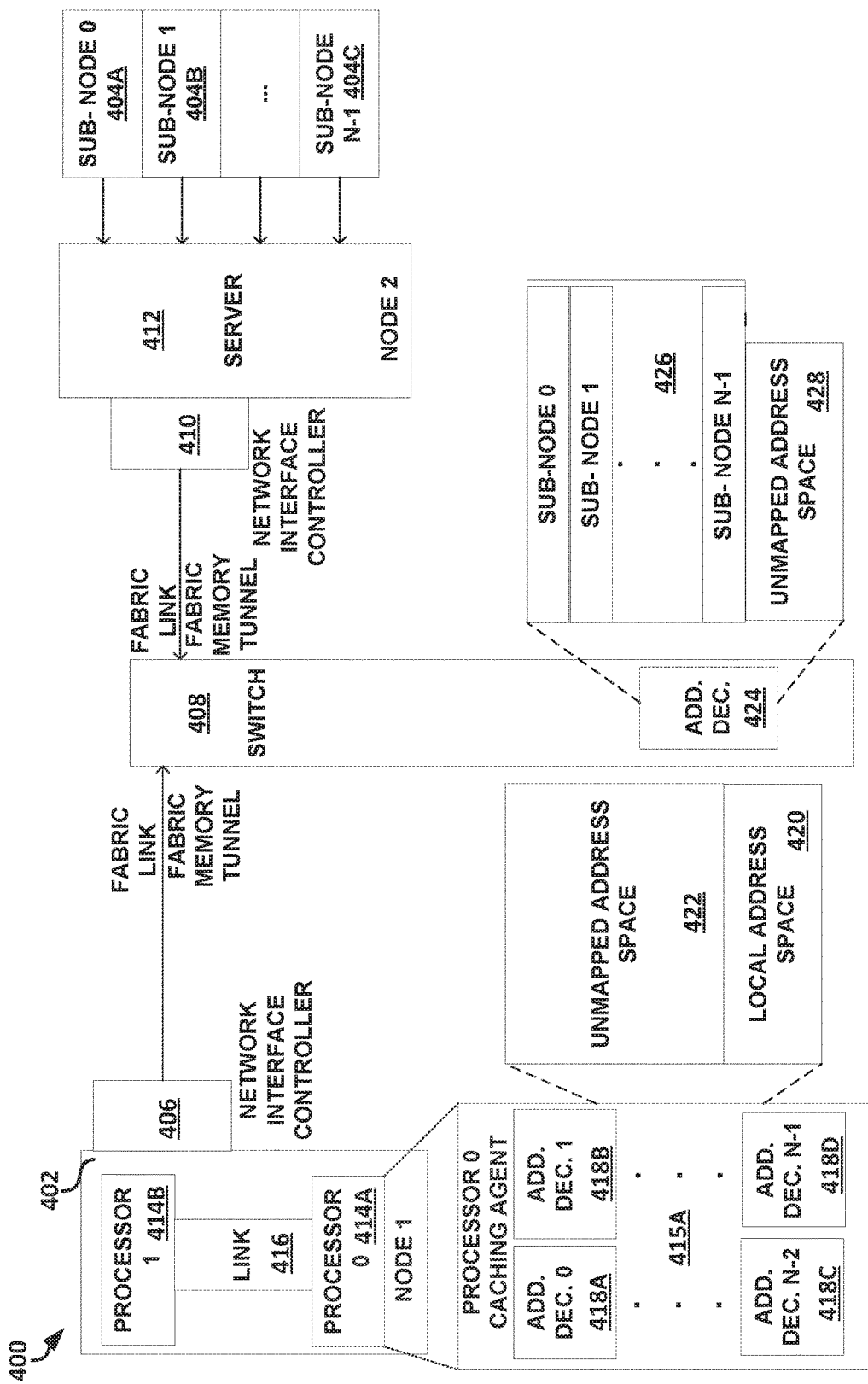
FIG. 4 illustrates, by way of example, a logical block diagram of an embodiment of a system with multiple layers of address decoding.

FIG. 4 illustrates, by way of example, a logical block diagram of an embodiment of a system 400 with multiple layers of address decoding. The system 400 as illustrated includes one or more local nodes 402 communicatively coupled to one or more remote nodes 404A, 404B, AND 404C through NIC 406, switch 408, NIC 410, and client server 412 (node 2). The local node 402 as illustrated includes a plurality of processors 414A and 414B communicatively coupled through a communication link 416.

Each of the processors 414A-B includes a caching agent 415A that includes a plurality of system address decoders 418A, 418B, 418C, and 418D. Each of the system address decoders 418A-D can be for a specific memory of the local memory space. The system address decoders 418A-D decode addresses homed to a respective local address space 420. An unmapped address space 422 is optional and provides for flexibility in altering the local address space 420, such as by expanding data stored in a local memory or adding another memory to the local address space 420. The caching agent 415A, such as by using the system address decoders 418A-D, can determine whether a memory request from the processor 414A-B is homed to a local address space 420. If the request is homed to the local address space 420, the caching agent 415A can forward the request to the local memory controller (not shown in FIG. 4), such as to retrieve the contents of that address space or overwrite the contents of that address space with the data in the request. If the request is not horned to the local address space 420 (it is horned to a remote node 404A-C), the caching agent 415A can forward the request to the network interface controller 406.

A caching agent is a hardware, software, and/or firmware component that can initiate transactions with memory. A caching agent can retain one or more copies in its own cache structure. A caching agent can provide one or more copies of the coherent memory contents to other caching agents or other components, such as NICs, switches, routers, or the like.

The system address decoders 418A-D provide coherency within the node 402. The system address decoders 418A-D process memory requests from the processors 414A-B within the same node.

The NIC 406 is a hardware component that connects a node to a network (e.g., the node 402 to the network(s) connected to the switch 408). The NIC 406 hosts circuitry to communicate using a specific standard (e.g., Ethernet, Wi-Fi, Internet Protocol (IP), cellular (e.g., Long Term Evolution (LTE), or the like). The NIC 406 allows nodes to communicate over wired or wireless connections therebetween. The NIC 406 can provide access to a physical layer and/or a data link layer, such as by providing physical access to a network medium and for addressing, such through media access control (MAC) addresses in the case of an Institute for Electrical and Electronics Engineers (IEEE) 802.11 network. The NIC 406 receives memory requests that are determined, by the system address decoders 418A-D, to be homed remotely. The NIC 406 provides such memory to the switch 408 (e.g., a system address decoder 424 of the switch 408), such as with or without modification.

In one or more embodiments, the NIC 406 can modify the request, such as by including data from the request in a get or a put request, for example. The get or put request from the NIC 406 can then be provided to the switch 408.

The switch 408 as illustrated includes a system address decoder 424. The switch 408 filters and forwards packets between networks (e.g., local area network (LAN) segments, LANs, and/or WANs). The switch 408 can operate at the data layer and/or the network layer. The switch 408 keeps a record of the addresses of devices connected to it. With this information, the switch can identify which system is sitting on which port. Therefore, when a memory request is received, the switch can determine which port thereof to forward the request. Unlike a hub, a switch will allocate full bandwidth to each of its ports. So regardless of the number of nodes transmitting, users will always have access to the maximum amount of bandwidth. A hub however, allocates its bandwidth amongst all currently transmitting nodes so that when a single node is transmitting it gets the full bandwidth, but when multiple nodes are transmitting, each node only gets a portion of the full bandwidth. A switch transmits frames, where a router, as its name implies, is to route a request to other networks until that request ultimately reaches its destination.

In one or more embodiments, the switch 408 can track what nodes have copies of at least part of other memory of other nodes. For example, the switch 408 can track which nodes are active and operational and which are non-operational. If a node fails (becomes non-operational), the switch 408 can detect such an event, such as by having a memory request to that node fail one or more times. The switch 408 can then notify one or more nodes that include the copies of at least part of the memory of the node that failed and can route requests to those nodes with future memory requests homed to the node that failed.

The system address decoder 424 as illustrated maps to the remote memory space 426 and an optional unmapped address space 428. The system address decoder 424 decodes the address of the memory request from the node 402 to determine the node to which the request is homed. The switch 408 then forwards the request to the proper NIC 410. The NIC 410 is similar to the NIC 406, with the NIC 410 connecting the remote node 412 to other networks. The unmapped address space 428 is optional and can provide flexibility in a number of nodes that are connected to the switch 408, such as to allow a node to be added to the system 400.

The NIC 410 provides a request to the client server 412, which serves the request to the proper sub-node 404A-C. The server 412 provides resources to the sub-nodes 404A-C, which request services of the server 412. A response to the request from the sub-node 404A-C is provided back to the NIC 410. The NIC 410 provides the response to the switch 408, which decodes the address to which the response is homed. The switch 408 then provides the response to the NIC 406, which provides the response to the corresponding processor 414A-B.

As can be appreciated by the description of FIG. 4, embodiments discussed can implement two levels of system address decoding. The first level can be used to determine whether the requested memory address(es) are hosted by memory in the local node or by remote memory. The second level (once it has been determined that the memory address is remote and the request has been sent to the NIC 406 and/or switch 408) takes place at the switch 408 and determines what remote node or nodes of the DSM (the fabric) should be targeted by the given request.

The system address decoders 418A-D in the local nodes 402 are configured to specify that all the remote memory is homed by the local NIC 406. All requests targeting non-local address space (e.g., the address space 422) can be sent to the NIC 406. Some address space can be left open, such as to support increase or decrease in the size of the exposed memory.

The NIC 406 can be configured to generate requests to the switch 408, such as for requests in which the destination node is not specified or is set to a specified value or range of values. The request from the processor 418A-B specify a target node (e.g., using a node identification). However, remote memory requests coming from the system address decoder 418A-D can generate requests without a target node id or including a target id with a specified value or range of values. This field can be generated or overwritten using the switch 408 and/or the NIC 406.

The switch 408 includes logic that contains the system address decoder 424. The system address decoder 424 maps all the different memory exposed by remote nodes to corresponding node ids. The switch 408 includes one or more interfaces that can be used to setup or change the system address decoder 424. How the system addresses map and how it is mapped to the nodes can be managed by a data center orchestrator 534 (see FIG. 5). The system address decoder 424 can specify that one address space is mapped to one or more nodes. This can be used for replication, fault-resilience, or other advantages.

Security

Security threats in DSM arise, as in non-distributed memory systems, when a process is permitted inappropriate access to physical memory regions that are mapped by some other process. In this sense, embodiments described herein can use or implement current memory mapping protections (e.g., page tables, protection keys, or the like).

Figure 5:
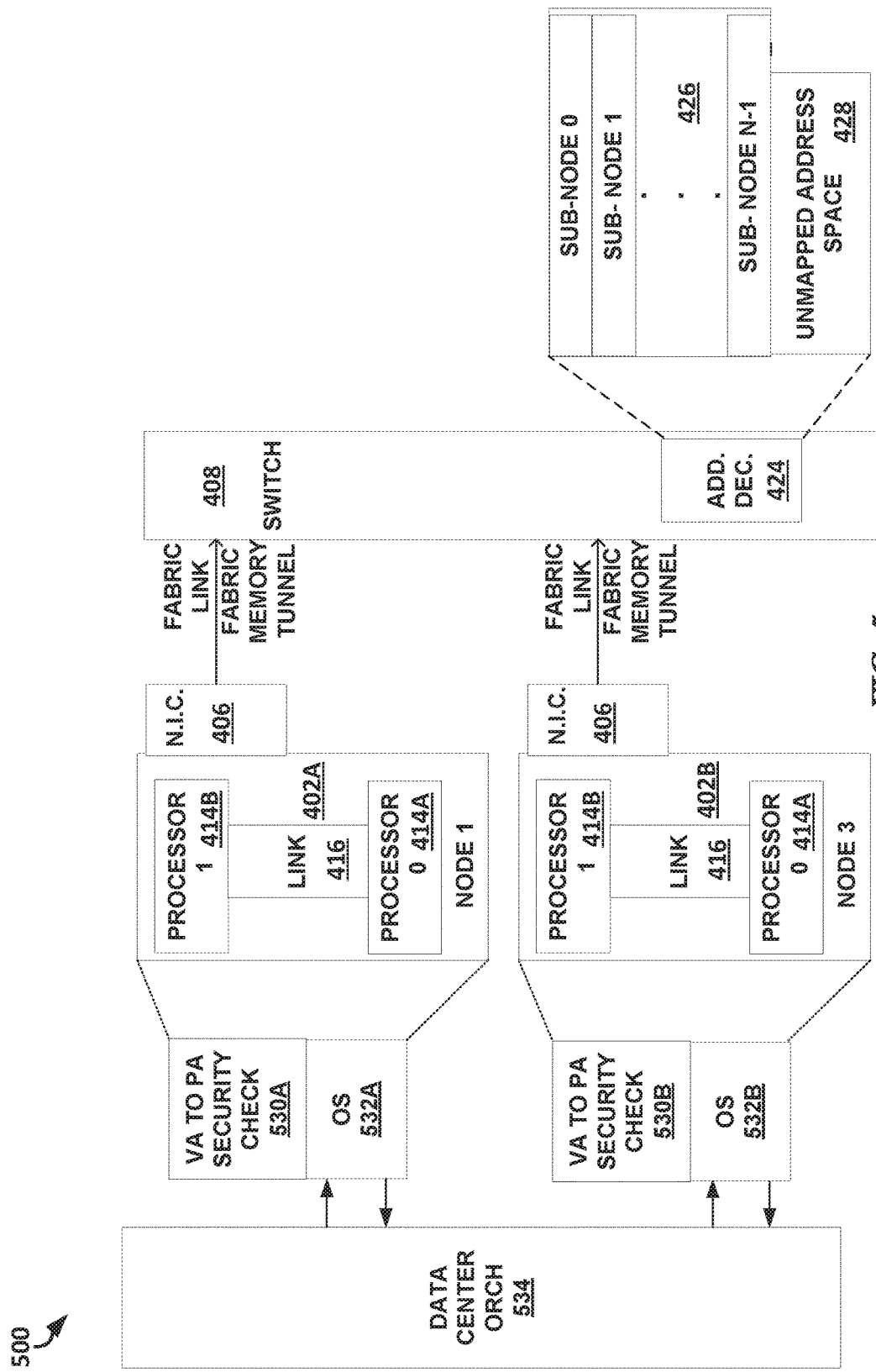
FIG. 5 illustrates, by way of example, a logical block diagram of an embodiment of a portion of a system that includes security features.

One advantage of one or more embodiments discussed herein is that the additions/alterations can be implemented (transparently from the standpoint of a user) existing architectures while preserving the security needs and features that the current architectures expose. FIG. 5 illustrates, by way of example, a logical block diagram of an embodiment of a portion of a system 500 that includes security features. The system 500 is similar to the system 400, with the system 500 illustrated as including security features. The security features include virtual address (VA) to physical address (PA) security check module (VATPASC) 530A and 530B, an operating system (OS) 532A and 532B on each local node 402A and 402B, respectively, and a data center orchestrator (DCO) 534. The DCO 534 configures a physical global address space, such as by assigning a PA to each of the nodes that expose memory space to other nodes of the DSM. The OS 532A-B communicates with the DCO 534 to allocate physical memory to the local processes requesting such memory. The PA range is mapped to a VA range of an application (or vice versa) and future accesses to the VA range can proceed with the corresponding page table entry (PTE) checks, such as by the VA to PA security check module.

Figure 6:
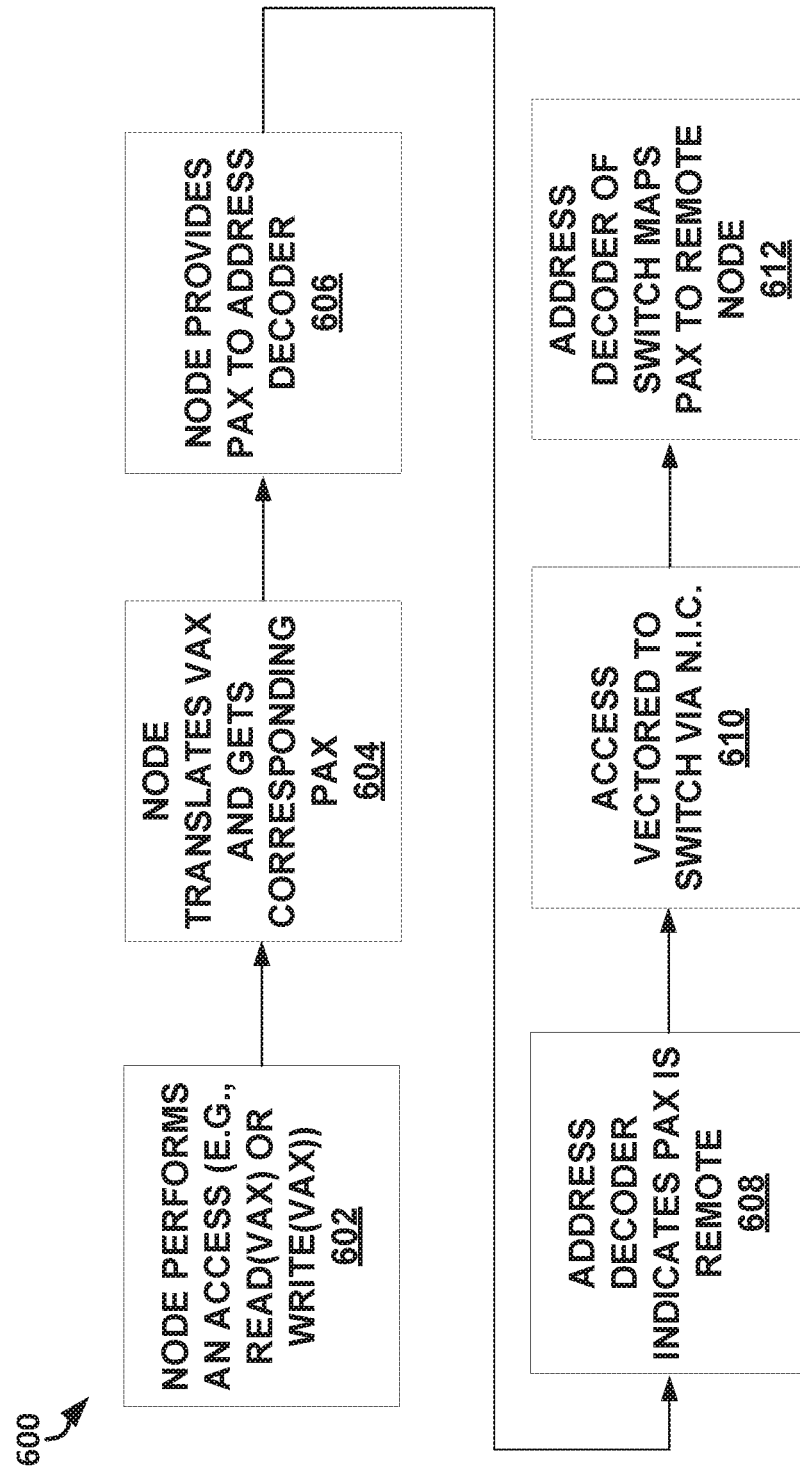
FIG. 6 illustrates, by way of example, a flow diagram of an embodiment of operations performed in a technique for performing a memory request.

FIG. 6 illustrates, by way of example, a flow diagram of an embodiment of operations 600 performed in a technique for performing a memory request. Operations 600 can be performed by one or more components illustrated in FIGS. 4 and/or 5. The operations 600 as illustrated include a local node (e.g., the node 402A-B) performing an access, such as a read or a write performed as a function of a VA and by a processor, at operation 602; the local node translating the VA to a PA, such as by using a PTE of a VATPASC module 530A-B, at operation 604; the node providing the PA to a system address decoder 418A-D of the node, at operation 606; the system address decoder 418A-D indicating the PA is homed to a remote node (e.g., 404A-C), at operation 608; the NIC 406 vectoring the request to a switch 408, at operation 610; and a system address decoder 424 of the switch 408 mapping the PA to a remote node, at operation 612. The request can then be forwarded to the remote node and the result of the request forwarded back to the local node.

Using such a process, a memory protection check occurs around VA to PA translation. Another security implementation can include only using a resilient highly privileged micro-service to configure a system address decoder. Such an implementation helps protect the system address decoders from undesired changes in the address mappings that can be used by an attacker.

Ingress and Egress Logic

Figure 7:
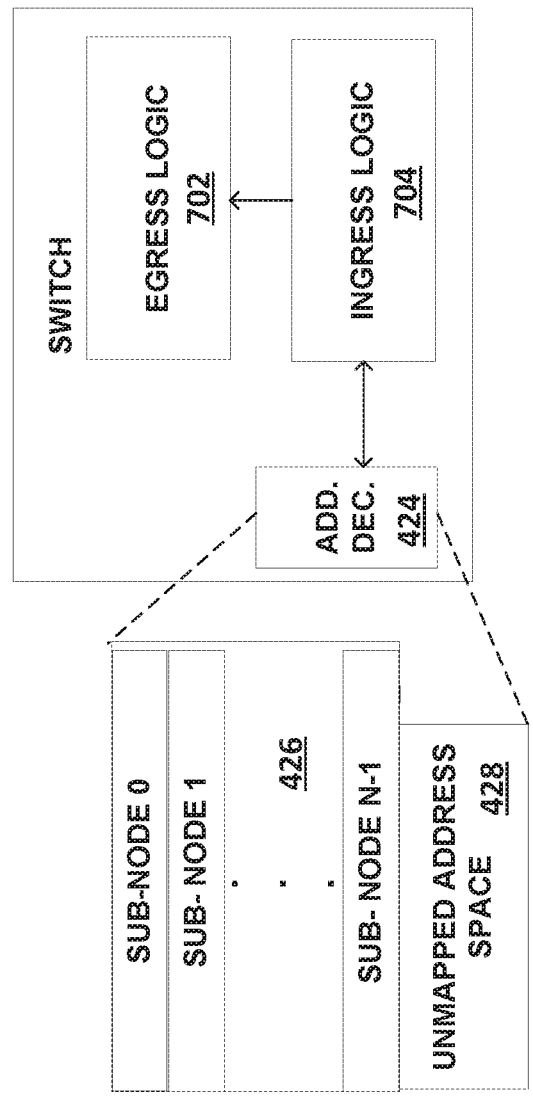
FIG. 7 illustrates, by way of example, a logical block diagram of an embodiment of the switch.

FIG. 7 illustrates, by way of example, a logical block diagram of an embodiment of the switch 408. The switch 408 as illustrated includes the system address decoder 424, egress logic 702, and ingress logic 704. The egress logic 702 includes one or more queues that can be used to store one or more messages that are to be routed to a node. The messages in the egress logic 702 can be from a memory responding to request. The ingress logic 704 includes one or more queues that can be used to store requests from nodes. The messages in the ingress queue can be provided to the address decoder of the switch to determine a node to which the request is homed.

As is previously discussed, one or more embodiments discussed herein can help increase functionality, flexibility, scalability and dynamism in a scale-out DSM architecture using pooled memory that is exposed via a fabric. Advantages can include one or more of: (1) using two levels of system address decoding, such as to determine where a given memory address is homed, provides for flexibility in adding and/or removing address space from the DSM; (2) scalability is easier with the added flexibility; (3) with a second level of decoding being done in the switch, anytime that a re-configuration is required, fewer system address decoders need to be updated as compared to previous solutions. As an example: consider an embodiment in which 4 switches connect a total of 16 dual socket nodes with 36 system address decoders each. Only the 4 system address decoders located in the switches need to be updated instead of the 9216 system address decoders of the compute nodes; and (4) providing more reliability in a DSM. For example, a switch may be configured to achieve reliability for a particular range of what it maps, by mapping memory lines in that range to, for example, three home nodes. This is just one example of how embodiments discussed herein can easily be configured to include beneficial features that are much more challenging to implement in previous solutions.

Even though embodiments discussed herein can introduce a cross-cutting feature spanning core (e.g., processor and/or node) and fabric elements, embodiments may not introduce new dependencies. Fabric capabilities and node capabilities can evolve orthogonally, as the local system address decoders only need to know if they can delegate further decoding elsewhere (e.g., to a system address decoder of a switch).

Communication Flow

Figure 8:
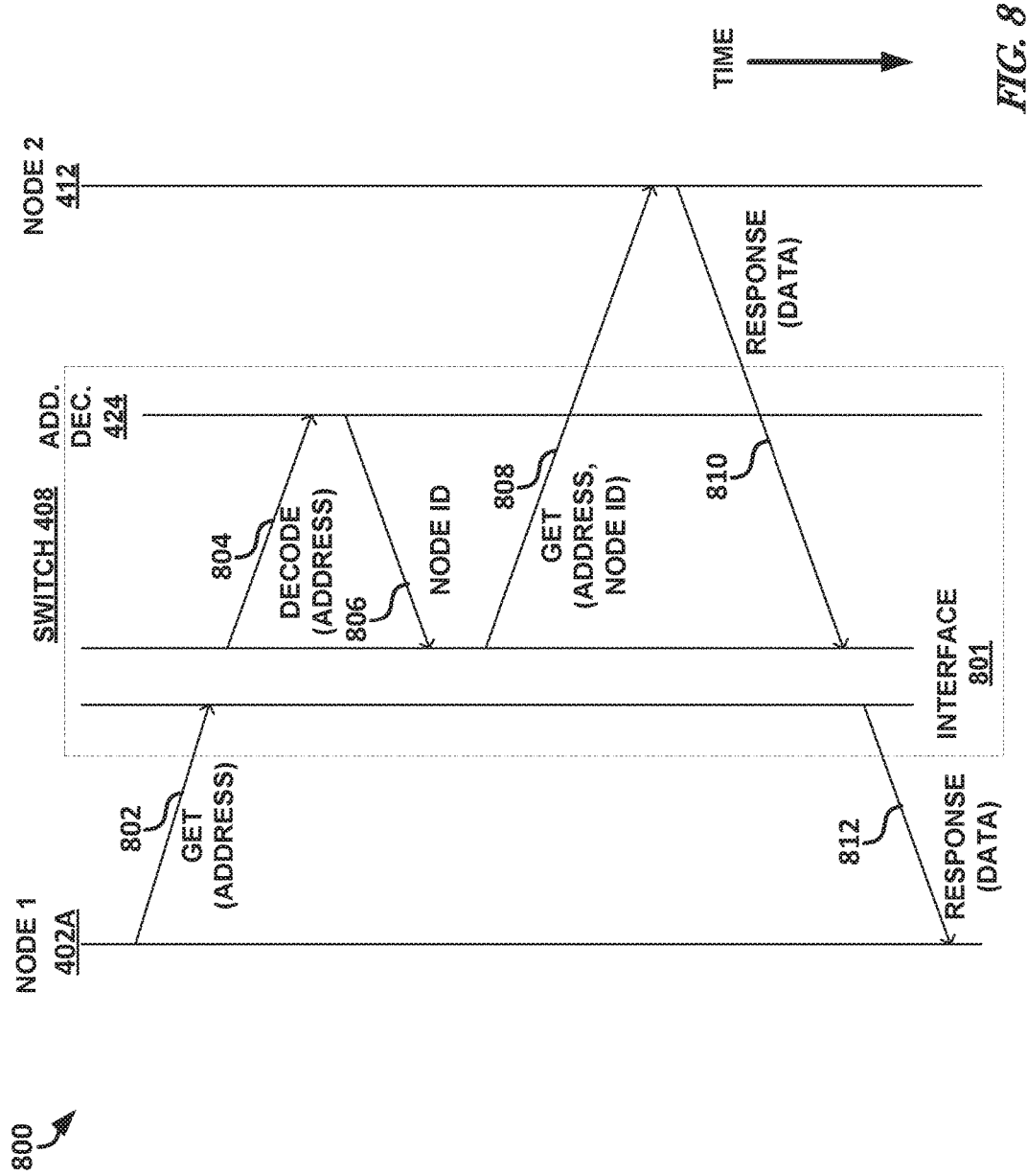
FIG. 8 illustrates, by way of example, a flow diagram of an embodiment of communications to implement a multi-level address decoding scheme.

FIG. 8 illustrates, by way of example, a flow diagram of an embodiment of communications 800 to implement a multi-level address decoding scheme. The communications 800 as illustrated include a get(address) request 802 from the node 402A to the switch 408. The get(address) request 802 in one or more embodiments can be from the NIC 406 of the nodes 402A. The get(address) request 802 is one or more packets from the node 402A that specifies an address from which to retrieve data. The packet can include a destination node id that is blank or set to a specified value (of a range of specified values). The get(address) request can be a modified version of a get(address) request from a processor 414A-B of the node 402A. The NIC 406 can modify the request by removing the node id or replacing the node id with a specified value (of a range of specified values). The get(address) request 802 can be provided in response to a system address decoder of the node 402A determining that the request is homed to a remote node.

The communications 800 further include a decode(address) request 804 from an interface 801 of the switch 408 to the system address decoder 424. The interface 801 exposes the switch logic (the system address decoder 424) to discover the final home. The interface can be accessed with a "get" command, for example.

The decode(address) request 804 can be forwarded to the system address decoder 424. If the address is not in the remote address space of the system address decoder 424 an error message can be created and provided to the node 402A. The error message can be provided to the NIC 406. The NIC 406 can create a software interrupt, such as to notify the node 402A of the error.

The operations 800 further include a node ID 806 from the system address decoder 424 to the interface 801. The node ID 806 is a unique identifier that points to a node that includes the address used in operations 802 and 804. The interface 801 can add the node ID 806 to a memory request to the node (node 412 in the example of FIG. 8). The interface 801 provides a get(address, node ID) request 808 to the corresponding node. The node 412 receives the request and provides a response(data) 810. The response (data) can include an acknowledge, an error indicator (e.g., not acknowledged), and/or data. The response(data) can be provided to the node 402A at operation 812.

The invention provides Intel unique differentiation on distributed shared memory fabric-connected systems without global memory coherence requirements.

Figure 9:
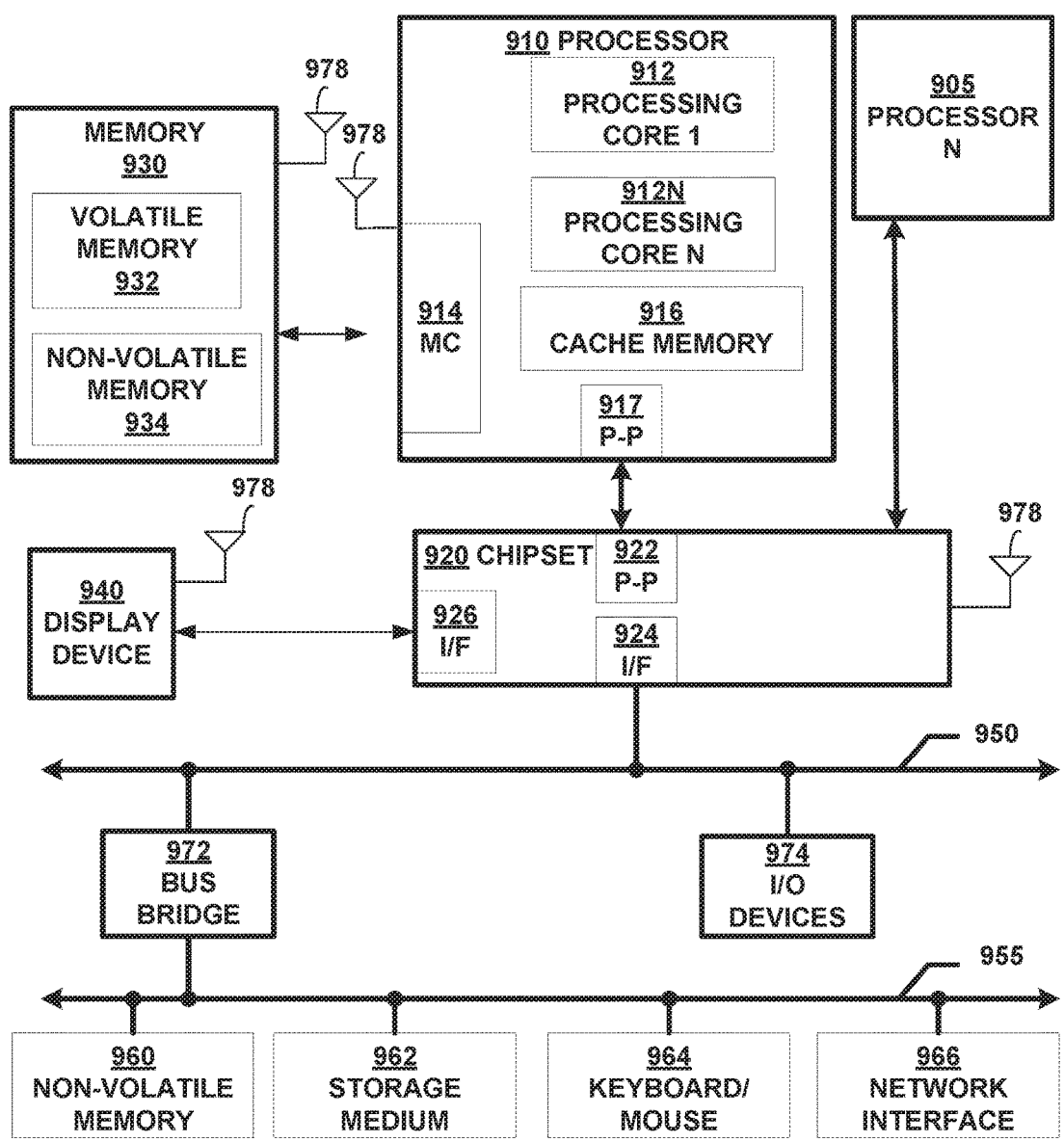
FIG. 9 illustrates, by way of example, a logical block diagram of an embodiment of a system.

FIG. 9 illustrates, by way of example, a logical block diagram of an embodiment of a system 900. In one or more embodiments, the system 900 includes one or more components that can be included in the node 402, 402A, 402B, processor 414A-B, system address decoder 418A-D, switch 408, system address decoder 424, NIC 406 and/or 410, server 412, sub-node 404A-C, VA to PA security check module 530A-B, OS 532A-B, data center orchestrator 534, egress logic 702, ingress logic 704, and/or interface 801.

In one embodiment, processor 910 has one or more processing cores 912 and 912N, where 912N represents the Nth processing core inside processor 910 where N is a positive integer. In one embodiment, system 900 includes multiple processors including 910 and 905, where processor 905 has logic similar or identical to the logic of processor 910. In some embodiments, processing core 912 includes, but is not limited to, pre-fetch logic to fetch instructions, decode logic to decode the instructions, execution logic to execute instructions and the like. In some embodiments, processor 910 has a cache memory 916 to cache instructions and/or data for system 900. Cache memory 916 may be organized into a hierarchal structure including one or more levels of cache memory.

In some embodiments, processor 910 includes a memory controller 914, which is operable to perform functions that enable the processor 910 to access and communicate with memory 930 that includes a volatile memory 932 and/or a non-volatile memory 934. In some embodiments, processor 910 is coupled with memory 930 and chipset 920. Processor 910 may also be coupled to a wireless antenna 978 to communicate with any device configured to transmit and/or receive wireless signals. In one embodiment, the wireless antenna interface 978 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 934 includes, but is not limited to, flash memory, phase change memory (PCM), read-only memory (ROM), electrically erasable programmable read-only memory (EEPROM), or any other type of non-volatile memory device.

Memory 930 stores information and instructions to be executed by processor 910. In one embodiment, memory 930 may also store temporary variables or other intermediate information while processor 910 is executing instructions. The memory 930 is an example of a machine-readable medium. While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions for execution by a machine (e.g., the control device 102 or any other module) and that cause the machine to perform any one or more of the techniques of the present disclosure, or that is capable of storing, encoding or carrying data structures used by or associated with such instructions. In other words, the processing circuitry 204 can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In the illustrated embodiment, chipset 920 connects with processor 910 via Point-to-Point (PtP or P-P) interfaces 917 and 922. Chipset 920 enables processor 910 to connect to other elements in system 900. In some embodiments of the invention, interfaces 917 and 922 operate in accordance with a PtP communication protocol such as the Intel® QuickPath Interconnect (QPI) or the like. In other embodiments, a different interconnect may be used.

In some embodiments, chipset 920 is operable to communicate with processor 910, 905N, display device 940, and other devices. Chipset 920 may also be coupled to a wireless antenna 978 to communicate with any device configured to transmit and/or receive wireless signals.

Chipset 920 connects to display device 940 via interface 926. Display device 940 may be, for example, a liquid crystal display (LCD), a plasma display, cathode ray tube (CRT) display, or any other form of visual display device. In some embodiments of the invention, processor 910 and chipset 920 are merged into a single SOC. In addition, chipset 920 connects to one or more buses 950 and 955 that interconnect various elements 974, 960, 962, 964, and 966. Buses 950 and 955 may be interconnected together via a bus bridge 972. In one embodiment, chipset 920 couples with a non-volatile memory 960, a mass storage device(s) 962, a keyboard/mouse 964, and a network interface 966 via interface 924 and/or 904, etc.

In one embodiment, mass storage device 962 includes, but is not limited to, a solid state drive, a hard disk drive, a universal serial bus flash memory drive, or any other form of computer data storage medium. In one embodiment, network interface 966 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the components shown in FIG. 9 are depicted as separate blocks within the system 900, the functions performed by some of these blocks may be integrated within a single semiconductor circuit or may be implemented using two or more separate integrated circuits. For example, although cache memory 916 is depicted as a separate block within processor 910, cache memory 916 (or selected aspects of 916) can be incorporated into processor core 912.

EXAMPLES AND NOTES

The present subject matter may be described by way of several examples.

Example 1 can include a node comprising one or more processors to generate a first memory request, the first memory request including a first address and a node identification, a caching agent coupled to the one or more processors, the caching agent to determine that the first address is homed to a remote node remote to the local node, a network interface controller (NIC) coupled to the caching agent, the NIC to produce a second memory request based on the first memory request, and the one or more processors further to receive a response to the second memory request, the response generated by a switch coupled to the NIC, the switch includes a remote system address decoder to determine a node identification to which the second memory request is homed.

In Example 2, Example 1 can further include, wherein the first address is a virtual address and the node further comprises a virtual address to physical address security check (VATPASC) module coupled to the one or more processors, the VATPASC to, before determining that the first address is horned to a node remote to the local node, convert the virtual address to a physical address and replace the first address of the first memory request with the physical address.

In Example 3, at least one of Examples 1-2 can further include, wherein the NIC is further to replace the node identification of the first memory request with a specified value to create the second memory request.

In Example 4, Example 3 can further include, wherein the caching agent to determine that the first address is horned to a node remote to the local node includes the caching agent to determine that the node identification of the memory request includes the specified value.

In Example 5, at least one of Examples 1-4 can include, wherein the one or more processors are to leave the node identification of the first memory request blank and the caching agent to determine that the first address is homed to a node remote to the local node includes the caching agent to determine that the node identification of the second memory request is blank.

Example 6 includes a non-transitory machine-readable storage device comprising instructions stored thereon that, when executed by a local node, configure the local node to generate a first memory request, the first memory request including a first address and a node identification, determine that the first address is horned to a remote node remote to the local node, produce a second memory request based on the first memory request, and receive, from a switch that includes a remote system address decoder to determine a node identification to which the second memory request is homed, a response to the second memory request.

In Example 7, Example 6 can further include, wherein the first address is a virtual address and the storage device further comprises instructions stored thereon that, when executed by the local node, configure the local node to, before determining that the first address is homed to a node remote to the local node, convert the virtual address to a physical address and replace the first address of the first memory request with the physical address.

In Example 8, at least one of Examples 6-7 further includes instructions stored thereon that, when executed by the local node, configured the local node to replace a node identification of the first memory request with a specified value to create the second memory request.

In Example 9, Example 8 further includes, wherein the instructions for determining that the first address is homed to a node remote to the local node include instructions for determining that the node identification of the second memory request includes the specified value.

In Example 10, at least one of Examples 6-9 further includes instructions stored thereon that, when executed by the local node, configure the local node to remove the node identification of the first memory request to create the second memory request and wherein the instructions for determining that the first address is homed to a node remote to the local node include instructions for determining that the node identification of the second memory request is blank.

Example 11 includes a method performed by a local node, the method comprising generating a first memory request, the first memory request including a first address and a node identification, determining that the first address is horned to a remote node remote to the local node, producing a second memory request based on the first memory request, and receiving, from a switch that includes a remote system address decoder to determine a node identification to which the second memory request is homed, a response to the second memory request.

In Example 12, Example 11 can further include, wherein the first address is a virtual address and the method further includes determining that the first address is homed to a node remote to the local node, convert the virtual address to a physical address and replace the first address of the first memory request with the physical address.

In Example 13, at least one of Examples 11-12 further includes replacing a node identification of the first memory request with a specified value to create the second memory request.

In Example 14, Example 13 further includes, wherein determining that the first address is homed to a node remote to the local node includes determining that the node identification of the second memory request includes the specified value.

In Example 15, at least one of Examples 11-14 further includes removing the node identification of the first memory request to create the second memory request and wherein determining that the first address is homed to a node remote to the local node includes determining that the node identification of the second memory request is blank.

Example 16 includes a distributed shared memory (DSM) system comprising a plurality of local nodes respectively comprising a first plurality of hardware processors, a local system address decoder coupled to the first plurality of hardware processors, a local memory coupled to the local system address decoder and a first network interface controller, the local system address decoder to determine whether a first memory request from a hardware processor of the plurality of hardware processors is homed to an address of the local memory or homed to a memory remote to the respective local node, a plurality of client servers respectively comprising a second network interface controller and a plurality of client nodes accessible therethrough, each of the plurality of client nodes including a remote memory, and a switch communicatively coupled between the first and second network interface controllers, the switch including a remote system address decoder to determine a node identification to which the first memory request is homed if the local system address decoder determines the address is homed to the remote memory, the switch to provide a second memory request to a second network interface controller of the plurality of second network interface controllers corresponding to the node identification to which the first memory request is horned.

In Example 17, Example 16 further includes, wherein the network interface controller of each of the plurality of local nodes is to perform one of (1) replace a second node identification in the first memory request with a specified node identification, and (2) remove the second node identification from the first memory request before providing the memory request to the switch.

In Example 18, at least one of Examples 16-17 includes, wherein the switch is to provide the first memory request from the network interface controller to the remote system address decoder in response to determining the second node identification is one of (1) the specified node identification and (2) blank.

In Example 19, at least one of Examples 16-18 includes, wherein the remote system address decoder is to determine a third node identification corresponding to a remote node of the plurality of remote nodes to which the memory request is homed.

In Example 20, Example 19 further includes, wherein the switch is to provide a second memory request to the remote node, the second memory request including the third node identification.

In Example 21, at least one of Examples 16-20 includes, wherein each of the local nodes comprise a virtual address to physical address security check (VATPASC) module executable by one or more of the first plurality of hardware processors, the VATPASC module to convert a virtual address of the first memory request to a physical address including a node identification and an address of a memory in a node corresponding to the node identification and produce a second memory request, the second memory request including the physical address and the address of the memory.

In Example 22, Example 21 includes, wherein the VATPASC module is to provide the second memory request to the local system address decoder.

In Example 23, at least one of Examples 16-22 includes, wherein the switch further comprises egress logic to queue responses to requests from the local nodes.

In Example 24, at least one of Examples 16-23 includes, wherein the switch further comprises ingress logic to queue memory requests from the local nodes.

Example 25 includes a method performed by a DSM system, the method including generating a first memory request from a local node, the first memory request including a first address, determining, at a local system address decoder of the local node, that the first address is homed to a node remote to the local node, producing, using a network interface controller coupled to the local node, a second memory request based on the first memory request, determining, using a remote system address decoder of a switch coupled to the network interface controller, a node identification of the node remote to the local node based on the first address in the second memory request, generating, using the switch, a third memory request including the determined node identification; and providing, from the switch and to the network interface controller of the local node, a communication including data responding to the third memory request.

In Example 26, Example 25 includes, wherein the first address is a virtual address and the method further includes before determining that the first address is homed to a node remote to the local node, convert the virtual address to a physical address and replace the first address of the first memory request with the physical address.

In Example 27, at least one of Examples 25-26 further includes replacing, at the network interface controller, a node identification of the first memory request with a specified value to create the second memory request.

In Example 28, Example 27 further includes, wherein determining that the first address is homed to a node remote to the local node includes determining that the node identification of the second memory request includes the specified value.

In Example 29, at least one of Examples 25-28 further includes removing, at the network interface controller, the node identification of the first memory request to create the second memory request.

In Example 30, Example 29 further includes, wherein determining that the first address is homed to a node remote to the local node includes determining that the node identification of the second memory request is blank.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A node comprising:
   one or more processors to generate a first memory request, the first memory request including a first address and a node identification;
   a caching agent coupled to the one or more processors, the caching agent to determine that the first address is homed to a remote node remote to the local node;
   a network interface controller (NIC) coupled to the caching agent, the NIC to produce a second memory request based on the first memory request; and
   the one or more processors further to receive a response to the second memory request, the response generated by a switch coupled to the NIC, the switch including a remote system address decoder to determine a node identification to which the second memory request is homed.

2. The node of claim 1, wherein the first address is a virtual address and the node further comprises a virtual address to physical address security check (VATPASC) module coupled to the one or more processors, the VATPASC to, before determining that the first address is homed to a node remote to the local node, convert the virtual address to a physical address and replace the first address of the first memory request with the physical address.

3. The node of claim 1, wherein the NIC is further to replace the node identification of the first memory request with a specified value to create the second memory request.

4. The node of claim 3, wherein the caching agent to determine that the first address is homed to a node remote to the local node includes the caching agent to determine that the node identification of the memory request includes the specified value.

5. The node of claim 1, wherein the one or more processors are further to leave the node identification of the first memory request blank and the caching agent is to determine that the first address is homed to a node remote to the local node includes the caching agent to determine that the node identification of the second memory request is blank.

6. A non-transitory machine-readable storage device comprising instructions stored thereon that, when executed by a local node, configure the local node to:
   generate a first memory request, the first memory request including a first address and a first node identification;
   determine that the first address is homed to a remote node remote to the local node;
   produce a second memory request based on the first memory request; and
   receive, from a switch that includes a remote system address decoder to determine a second node identification to which the second memory request is homed, a response to the second memory request.

7. The storage device of claim 6, wherein the first address is a virtual address and the storage device further comprises instructions stored thereon that, when executed by the local node, configure the local node to before determining that the first address is homed to a node remote to the local node, convert the virtual address to a physical address and replace the first address of the first memory request with the physical address.

8. The storage device of claim 6, further comprising instructions stored thereon that, when executed by the local node, configure the local node to replace a node identification of the first memory request with a specified value to create the second memory request.

9. The storage device of claim 8, wherein the instructions for determining that the first address is homed to a node remote to the local node include instructions for determining that the node identification of the second memory request includes the specified value.

10. The storage device of claim 6, further comprising instructions stored thereon that, when executed by the local node, configure the local node to remove the node identification of the first memory request to create the second memory request and wherein the instructions for determining that the first address is homed to a node remote to the local node include instructions for determining that the node identification of the second memory request is blank.

11. A distributed shared memory system comprising:
a plurality of local nodes respectively comprising a first plurality of hardware processors, a local system address decoder coupled to the first plurality of hardware processors, a local memory coupled to the local system address decoder and a first network interface controller, the local system address decoder to determine whether a first memory request from a hardware processor of the plurality of hardware processors is homed to an address of the local memory or homed to a memory remote to the respective local node;
a plurality of client servers respectively comprising a second network interface controller and a plurality of client nodes accessible therethrough, each of the plurality of client nodes including a remote memory; and
a switch communicatively coupled between the first and second network interface controllers, the switch including a remote system address decoder to determine a node identification to which the first memory request is homed if the local system address decoder determines the address is homed to the remote memory, the switch to provide a second memory request to a second network interface controller of the plurality of second network interface controllers corresponding to the node identification to which the first memory request is homed.

12. The system of claim 11, wherein the network interface controller of each of the plurality of local nodes is to perform one of (1) replace a second node identification in the first memory request with a specified node identification, and (2) remove the second node identification from the first memory request before providing the memory request to the switch.

13. The system of claim 12, wherein the switch is to provide the first memory request from the network interface controller to the remote system address decoder in response to determining the second node identification is one of (1) the specified node identification and (2) blank.

14. The system of claim 13, wherein the remote system address decoder is to determine a third node identification corresponding to a remote node of the plurality of remote nodes to which the memory request is homed.

15. The system of claim 14, wherein the switch is to provide a second memory request to the remote node, the second memory request including the third node identification.

16. The system of claim 11, wherein each of the local nodes comprise a virtual address to physical address security check (VATPASC) module executable by one or more of the first plurality of hardware processors, the VATPASC module to convert a virtual address of the first memory request to a physical address including a node identification and an address of a memory in a node corresponding to the node identification and produce a second memory request, the second memory request including the physical address and the address of the memory.

17. The system of claim 16, wherein the VATPASC module is to provide the second memory request to the local system address decoder.

18. The system of claim 11, wherein the switch further comprises egress logic to queue responses to requests from the local nodes.

19. The system of claim 18, wherein the switch further comprises ingress logic to queue memory requests from the local nodes.

20. A method performed by a distributed shared memory system comprising:
generating a first memory request from a local node, the first memory request including a first address;
determining at a local system address decoder of the local node, that the first address is homed to a node remote to the local node;
producing using a network interface controller coupled to the local node, a second memory request based on the first memory request;
determining using a remote system address decoder of a switch coupled to the network interface controller, a node identification of the node remote to the local node based on the first address in the second memory request;
generating, using the switch, a third memory request including the determined node identification; and
providing from the switch and to the network interface controller of the local node, a communication including data responding to the third memory request.

21. The method of claim 20, wherein the first address is a virtual address and the method further comprises:
before determining that the first address is homed to a node remote to the local node, convert the virtual address to a physical address and replace the first address of the first memory request with the physical address.

22. The method of claim 20, further comprising replacing at the network interface controller, a node identification of the first memory request with a specified value to create the second memory request.

23. The method of claim 22, wherein determining that the first address is homed to a node remote to the local node includes determining that the node identification of the second memory request includes the specified value.

24. The method of claim 20, further comprising removing at the network interface controller, the node identification of the first memory request to create the second memory request.

25. The method of claim 24, wherein determining that the first address is homed to a node remote to the local node includes determining that the node identification of the second memory request is blank.

* * * * *

UNITED STATES PATENT AND TRADEMARK OFFICE
CERTIFICATE OF CORRECTION

PATENT NO. : 10,095,629 B2  
APPLICATION NO. : 15/279319  
DATED : October 9, 2018  
INVENTOR(S) : Guim Bernat et al.

Page 1 of 1

It is certified that error appears in the above-identified patent and that said Letters Patent is hereby corrected as shown below:

On the Title Page

In item (72), in "Inventors", in Column 1, Line 1, before "Guim", delete "Cesc"

In the Claims

In Column 17, Line 4, in Claim 9, delete "horned" and insert --homed-- therefor

In Column 17, Line 13, in Claim 10, delete "horned" and insert --homed-- therefor Signed and Sealed this  
Fourth Day of January, 2022

Drew Hirshfeld  
*Performing the Functions and Duties of the  
Under Secretary of Commerce for Intellectual Property and  
Director of the United States Patent and Trademark Office*